United States Patent [19]

Nakamura

[11] Patent Number: 4,545,540
[45] Date of Patent: Oct. 8, 1985

[54] APPARATUS FOR STORING MERCURY-CONTAINING USED PRODUCTS

[76] Inventor: Akira Nakamura, 11-17 Tokiwadai 1-chome, Itabashi-ku, Tokyo, Japan

[21] Appl. No.: 524,038

[22] Filed: Aug. 17, 1983

[30] Foreign Application Priority Data

| Sep. 8, 1982 | [JP] | Japan | 57-155276 |
| Feb. 21, 1983 | [JP] | Japan | 58-26302 |
| Mar. 28, 1983 | [JP] | Japan | 58-50525 |
| Mar. 28, 1983 | [JP] | Japan | 58-50527 |

[51] Int. Cl.[4] .............................................. B02C 19/14
[52] U.S. Cl. .................................... 241/99; 241/100
[58] Field of Search ............... 241/99, 100, 375, 224, 241/243, 63, 64, 101.7, 152 A, 101.2; 225/40, 93, 97, 96.5, 94

[56] References Cited

U.S. PATENT DOCUMENTS

| 2,628,036 | 2/1953 | Hall | 241/99 X |
| 3,151,814 | 10/1964 | Morgan et al. | 241/99 |
| 3,913,849 | 10/1975 | Atanasoff et al. | 241/99 X |
| 4,093,126 | 6/1978 | Castiaux | 241/99 X |
| 4,153,206 | 5/1979 | Haefner et al. | 241/14 |
| 4,205,794 | 6/1980 | Horton et al. | 241/73 |
| 4,226,377 | 10/1980 | Shelton | 241/99 |
| 4,288,038 | 9/1981 | Williams | 241/73 |

FOREIGN PATENT DOCUMENTS

| 683533 | 12/1952 | United Kingdom . |
| 941841 | 11/1963 | United Kingdom . |
| 1449194 | 9/1976 | United Kingdom . |
| 1562042 | 3/1980 | United Kingdom . |
| 1596424 | 8/1981 | United Kingdom . |

Primary Examiner—Mark Rosenbaum
Attorney, Agent, or Firm—Wenderoth, Lind & Ponack

[57] ABSTRACT

An apparatus for storing used products such as fluorescent lights, thermometers, mercury vapor lamps and batteries which contain injurious substances, particularly mercury compound. Used products are accommodated in a housing and injurious substances suspended in air in the housing are drawn by a suction device. A filter and adsorbent unit are arranged in a passage of ventilating air so as to remove dust and mercury compound. The ventilating air is exhausted from an outlet portion after it has passed through the suction device.

15 Claims, 12 Drawing Figures

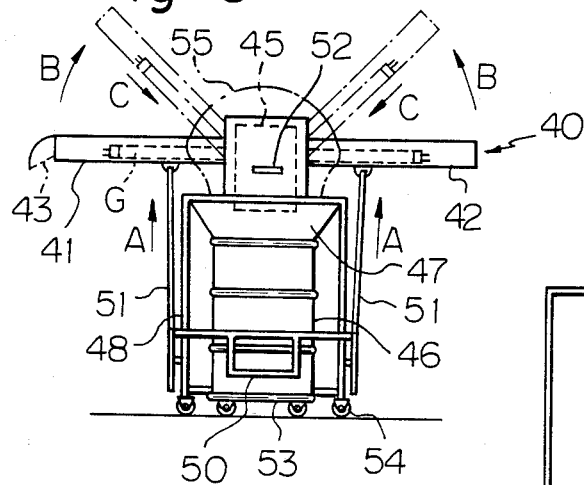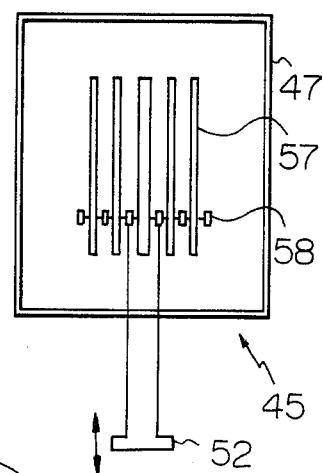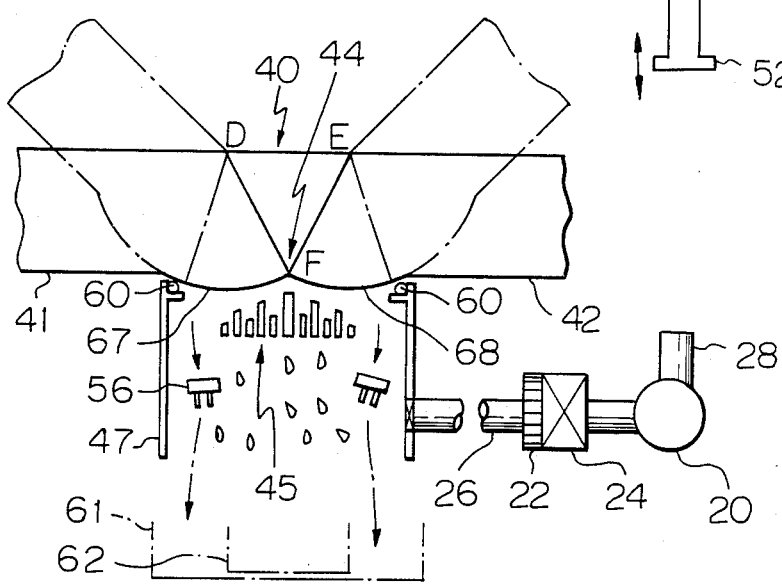

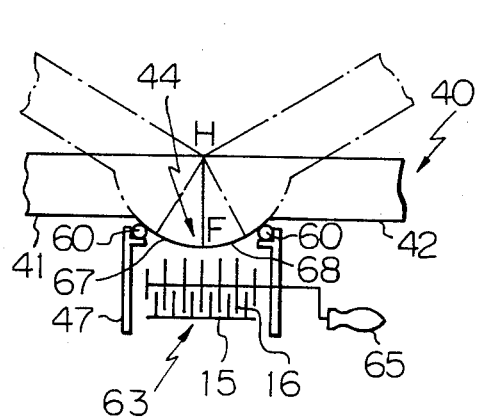
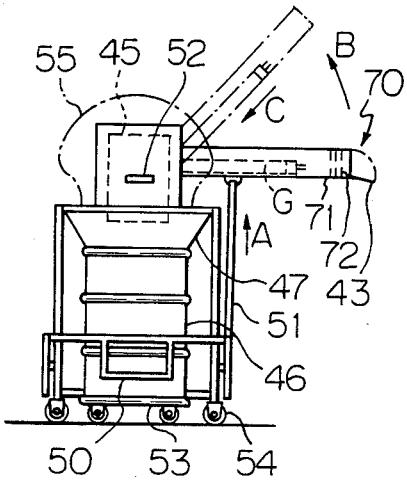
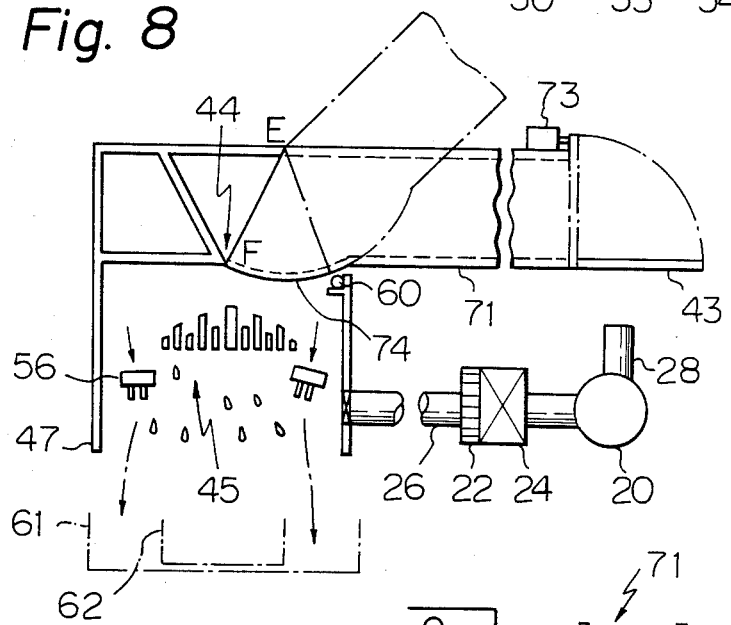
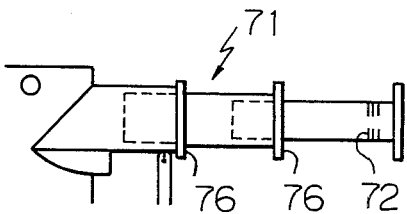
Fig. 6
Fig. 7
Fig. 8
Fig. 9

APPARATUS FOR STORING MERCURY-CONTAINING USED PRODUCTS

BACKGROUND OF THE INVENTION

This invention relates to an apparatus for storing used products such as fluorescent lights, thermometers, mercury vapor lamps and batteries which contain injurious substances, particularly mercury (Hg) compound.

It is generally known that a kind of glassware such as a fluorescent light, thermometer or mercury vapor lamp, contains a small amount of mercury compound, so that if someone inhales mercury vapor on the occasion of destruction of the glassware in his health will be adversely affected. However, since no equipment or facilities are available for treating such used products, mercury compound is incessantly diffused into the air from open-air dump yards and landfills. In particular, on the occasion of a strong wind, a great amount of fine glass particles and floating mercury compound are emitted into the air and accumulate in human bodies through their respiratory organs.

Furthermore, it can be appreciated that destroying such glassware for reducing its volume is considerably dangerous, so that it often hurts a worker or even a passerby. In addition, storing used glassware in a factory or office causes great inconvenience and anxiety.

As another problem of mercury compound, we have to pay attention to the enormous consumption of batteries such as dry cells and mercury batteries. Used batteries are generally deposited in dust boxes without being destroyed and then transferred to a landfill. Since batteries contain a small amount of injurious substances such as mercury compound, if such great consumption continues indefinitely, a great amount of mercury will eventually flow out and do harm to human bodies. Accordingly, it is necessary to collect used batteries separately from other wasted articles. However, it has been considered difficult to collect and store a number of used batteries from a technical point of view, because there are problems of heat caused by remaining electricity and diffusion of rusted metals.

SUMMARY OF THE INVENTION

It is an object of the present invention to provide an apparatus for accommodating used products containing injurious substances and for removing the substances emitted on the occasion of destroying glassware or with the lapse of storing time.

It is another object of the present invention to provide an apparatus for storing used products for a time before transferring them to a reutilization plant or a landfill.

The foregoing and other objects of the invention are accomplished by providing an apparatus comprising suction means for drawing injurious substances and dust, a filter for removing the dust, adsorbent means for absorbing the substances, and an outlet for ventilating air.

A housing for accommodating used products and an inlet portion for receiving them can be designed in various manners corresponding to the size and shape of the products.

In the case of treating glassware products, it is preferable to provide crusher means for destroying them.

Other objects, features and advantages of the invention will become apparent from a reading of the specification, when taken in conjunction with the drawings, in which, like reference numerals refer to like elements in the several views.

BRIEF DESCRIPTION OF THE DRAWINGS

FIG. 3 is a side elevational view of a third embodiment of the invention.

FIG. 4 shows in detailed cross-section, on an enlarged scale, of an opening and closing mechanism of the ejector door between the guide arms shown in FIG. 3.

FIG. 5 shows in horizontal cross section the crusher shown in FIG. 4.

FIG. 6 shows in detailed cross section the alternative mechanism, similar to FIG. 4, of the ejector door.

FIG. 7 is a side elevational view, similar to FIG. 3, of a fourth embodiment of the invention.

FIG. 8 shows in detailed cross section, on an enlarged scale, of the opening and closing mechanism of the ejector door of the guide arm shown in FIG. 7.

FIG. 9 shows in side elevation the telescopic mechanism of the guide arm.

DESCRIPTION OF THE PREFERRED EMBODIMENT

Figure 1:
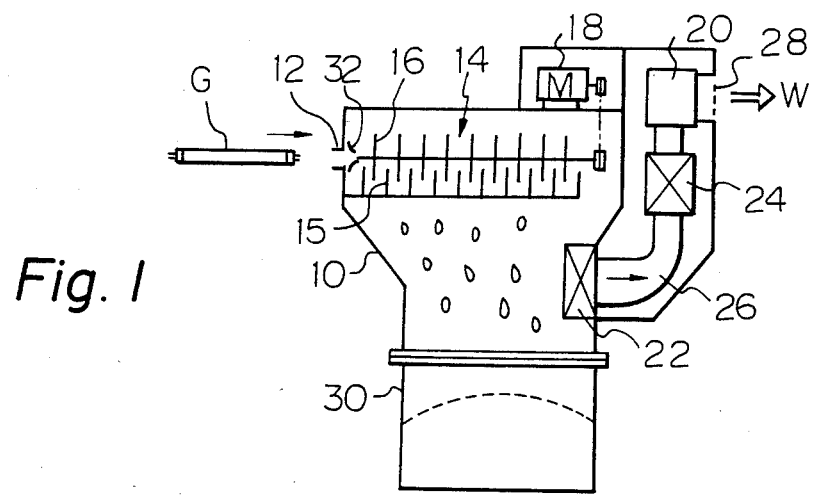
FIG. 1 is a vertical sectional view of a first embodiment of the apparatus according to the invention.

Referring to FIG. 1, there is shown a storing apparatus for accommodating used products including glassware such as fluorescent lights. The apparatus includes a housing 10 for accommodating used glassware, an inlet portion 12 for receiving the glassware, a crusher 14 for destroying them, a suction fan 20 driven by a motor (not shown), a filter 22 for removing dust, adsorbent unit 24 for adsorbing injurious substances such as mercury compound, and an outlet portion 28 for exhausting ventilating air. A fluorescent light G is inserted in a horizontal direction through the inlet portion 12. This direction can be modified into a vertical or inclined direction so that a fluorescent light falls down due to its gravity. The insertion may be performed automatically with a feeding mechanism.

The glass portion of the fluorescent light G is crushed by the crusher 14 which includes a stationary blade 15 and a rotary blade 16 driven by a motor 18. Plug portions at both ends of the fluorescent light are generally destroyed at the same time; otherwise they would fall down into the bottom of the housing without being destroyed. The crusher can be modified by another destroying mechanism which can be, for example, of the rotary-type, piston-type or vibration-type. It is also possible to apply a supersonic device to the destroying mechanism.

In consequence of the crushing operation of the fluorescent lights, the internal space of the housing 10 becomes filled with fine pieces of broken glass and other injurious particles suspended in air therein. These particles are removed by means of the suction fan 20 or a suitable blower. In a passage 26 of ventilating air, a filter 22 and an adsorbent unit 24 are located. The adsorbent unit 24 is composed of an adsorbent, for example activated charcoal or chelete resin, which can be any kind of gaseous type, liquid type or solid type. Clean air after having passed through the suction fan 20 is exhausted from the outlet portion 28 into the air, as indicated by the direction W.

The suction fan 20 can be located between the filter 22 and the adsorbent unit 24.

For the purpose of removing remaining injurious substances after the termination of the crushing operation, the suction fan 20 is preferably designed such that it continues ventilating operation for thirty seconds or more after the crushing operation has stopped.

The bottom portion 30 of the housing 10 is preferably designed to be removable from the housing with a seal member arranged therebetween. Thus, when the housing 10 is filled up with broken pieces, the bottom portion 30 is detached from the apparatus and transferred to a reutilization plant or a landfill, with a cover thereon. It is preferable to substitute a conventional drum for the bottom portion 30.

For the purpose of keeping of the housing 10 airtight, it is preferable to provide a seal member 32 adjacent the inlet portion 12.

Figure 2:
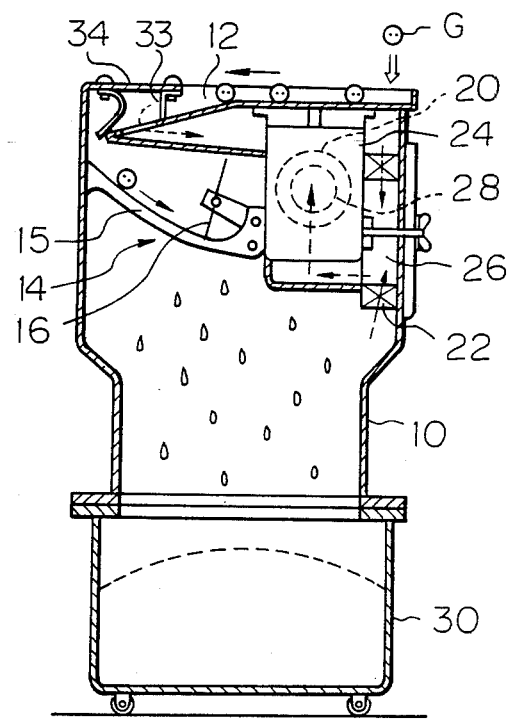
FIG. 2 is a vertical sectional view, similar to FIG. 1, of a second embodiment of the invention.

FIG. 2 illustrates an alternative arrangement of the apparatus in which fluorescent lights G roll down on a sloping inlet 12 toward a crusher 14 which includes a stationary blade 15 and a rotary blade 16. In this embodiment, two seal members 33 and 34 are arranged in the sloping inlet 12, whereby during the operation of the suction fan 20 ventilating air flows as indicated by the dotted arrow lines, thereby forming a vacuum space between the seals 33 and 34. This vacuum space produces an effective airtightness between the outside and the inside of the housing 10. As already described in connection with FIG. 1, ventilating air passes through the filter 22, passage 26 and adsorbent unit 24, and then flows out from the outlet portion 28.

Since there are several kinds of fluorescent lights, for example, a straight tube, a circular tube and a bulb, the inlet portion 12 and the crusher 14 can be modified so as to accomodate the shape of the light.

In further applications of the invention, the apparatus can be provided with a counter for calculating the number of the lights or a sensor for detecting the density of vaporized mercury.

According to the embodiments described above, the crushing operation is performed in a housing isolated from the outside environment, so that an operator cannot be hurt and no injurious, substance is diffused into the air.

Referring to FIGS. 3 and 4, there is shown a modified apparatus which comprises an inlet portion 40, a crusher 45, a drum 46 for collecting fragments of broken glass, a housing 47 for enclosing the crusher 45, and a frame 48 for supporting the entire assembly except for the drum 46. The inlet portion 40 includes two guide arms 41 and 42 adapted to be reciprocally folded up and down, simultaneously. The inlet portion 40 further includes an entrance door 43 for receiving used glassware and an ejector door 44 arranged between the arms 41 and 42. The lower portion of the housing 47 communicates with the opening of the drum 46.

The entrance door 43 is provided on a side or on top of the guide arms. The ejector door 44, as shown in FIG. 4, is closed in a straight position of the arms 41 and 42 in which each arm extends substantially horizontal and is opened in a folded position of the arms in which each arm inclines.

An operator puts an appropriate number of glassware pieces such as, fluorescent lights G, into the guide arms 41 and 42 after opening the entrance door 43, and then closes the entrance doors. When a florescent light is inserted into the inlet portion 40 at the straight position of the arms, the ejector door 44 is closed and inner space of the arms is isolated from the crusher 45. Thus, the operator cannot get hurt by such an accident as when an inserted fluorescent light contacts the crusher and bursts away toward the operator.

After putting the fluorescent lights into the inlet portion, the operator steps on a pedal 50, thereby lifting connecting rods 51 in the direction A by means of a linking mechanism, and lifting guide arms 41 and 42 in the direction B. As the arms rotate into the folded position, fluorescent lights G are folded and destroyed, whereby broken pieces move down in the direction C due to their gravity, and then fall down through the ejector door 44 which is open toward the crusher 45. The operator then moves a manual lever 52 back and forth, thereby starting the crusher 45 in motion to crush the fragments of broken glass into fine pieces by cooperating action of a stationary blade 57 and a thrust blade 58 (FIG. 5). The broken pieces fall down into the drum 46 and are stored therein (FIG. 3). In this respect, if the top portion of the crusher 45 is formed into a ridge configuration as shown in FIG. 4, plug portions 56 of fluorescent lights fall down along the side wall of the housing 47 toward a separate container 61 while broken glass falls down into another container 62, thus affecting separate storage.

In FIG. 3, the drum 46 is mounted on a stand 53 with castors and is detachable from the apparatus for the convenience of discharging the substance at a reutilization plant or a landfill.

The assembly of the apparatus is constructed as a handcart with castors 54, or a motor-car powered by a battery mounted thereon or by an outside power source.

It is preferable to provide a soft expansible cover 55 so as to enclose the center portion between the arms 41 and 42 and around the crusher 45, thereby eliminating noise emission during the crushing operation and preventing fine particles from scattering into the air.

In FIG. 6, there is shown an alternative crusher 63, which is similar to that of FIG. 1 with the exception of a rotary handle 65.

As already described, the crushing operation is preferably performed in a closed system. For this purpose, it is especially recommendable to provide seal portions adapted to isolate the inner space of the apparatus from the outside atmosphere (FIG. 4 and FIG. 6). In FIG. 4, guide arms 41 and 42 rotate about the pivots D and E, respectively. In a straight position in which each arm extends substantially horizontally, inner ends of the arms 41 and 42 abut each other at the point F, thereby closing the ejector door 44. At the bottom sides of the inner ends of the arms 41 and 42, there are provided arcuate protrusions 67 and 68, each protrusion being arched around the center points D and E, respectively. While the arms are moved into an inclined position opening the abutment point F, the protrusions 67 and 68 rotate around the pivots keeping their surfaces in contact with seal members 60 which are mounted on the housing 47, thereby maintaining a closed system. In FIG. 6, each guide arm 41 and 42 rotates around the pivot H, and the sealing action is effected in the same way between each of the protrusions 67 and 68 and the seal member 60.

Constructions and functions of the suction fan 20, filter 22 and adsorbent unit 24 in FIG. 4 are the same as described in connection with FIG. 1.

FIG. 7 illustrates an alternative arrangement of the apparatus in which only one guide arm 71 is provided as an inlet portion 70, and a sealing brush 72 is located adjacent the entrance door 43 for preventing broken pieces from bursting out by accident. As illustrated in the enlarged view of FIG. 8, a protrusion 74 is arched around the center E so as to keep its surface in contact with the seal member 60 while the arm 70 moves. An electrical switch 73 is provided so as to detect the closing condition of the entrance door 43. In addition, a self-lock mechanism of the arm 71 is preferably provided with the aid of mechanical or electrical system. This switch 73 and the self-lock mechanism (not shown) are used to control the movement of the guide arm 71 such that the arm never moves upward unless the entrance door 43 is closed, otherwise there is a danger that broken pieces might burst out from the entrance door 43.

The guide arm 71 can be constructed in telescopic fashion as illustrated in FIG. 9, or in a detachable fashion, separate from the housing. Such types of the arm should be provided with seal members 76 arranged at the connecting portions.

Figure 10:
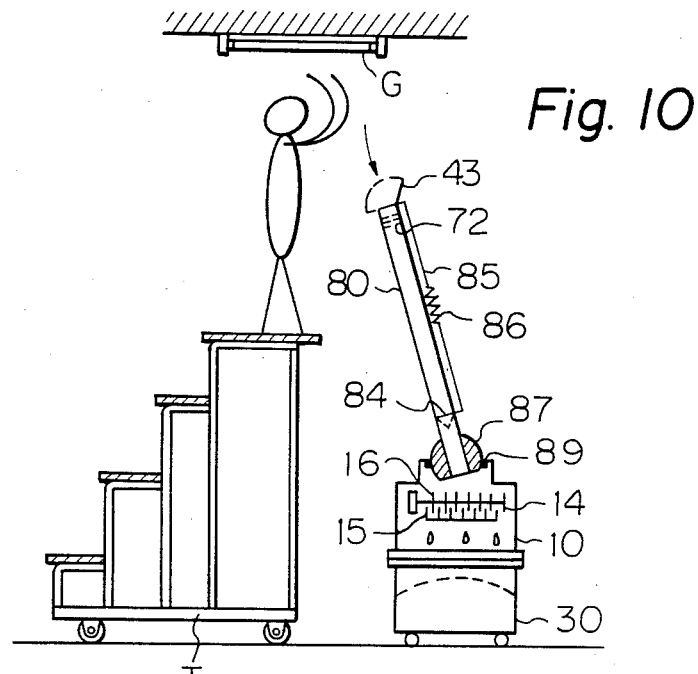
FIG. 10 is a vertical sectional view, partly schematic, of a fifth embodiment of the invention.

FIG. 10 illustrates working circumstances in which an operator standing on a table T takes a fluorescent light G off the ceiling and then throws it into the apparatus of the present invention. This apparatus is convenient for inserting glasswares therein from above. The inlet portion consists of a guide barrel 80 which includes an entrance door 43, ejector door 84, sealing brush 72, linking mechanism 85 for connecting the doors 43 and 84, shock absorbing spring 86, and a spherical bearing 87 for changing the direction of the guide barrel 80. Between the housing 10 and the spherical bearing 87, there is provided a seal member 89 for providing isolation. Linking mechanism 85 is constructed such that the ejector door 84 opens only when the entrance door 43 closes by means of a well known system. On the top surface of the ejector door 84, it is preferable to mount a rubber cushion (not shown). The sealing brush 72 acts as a damper for braking the falling speed of the fluorescent light G and also as a stopper for blocking broken pieces from bursting outwardly through entrance door 43.

Figure 11:
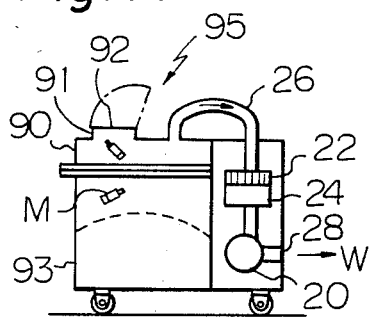
FIG. 11 is a vertical sectional view of a sixth embodiment of the invention.

FIG. 11 illustrates an apparatus 95 for storing used batteries (dry cells) according to the invention. Used batteries M are thrown into a housing 90 through an inlet opening 91 on which a cover 92 with a seal is mounted. The bottom portion 93 of the housing 90 is preferably constructed to be removable from the apparatus. Since used batteries emit heat and injurious vapor such as mercury compound while they are stored in a container, a suction fan 20 or blower should be arranged in the apparatus so as to draw out the heat and injurious vapor as occasion calls. In a passage 26 for ventilating air, a filter 22 and adsorbent unit 24 are located, and ventilating air is exhausted from an outlet portion 28.

Figure 12:
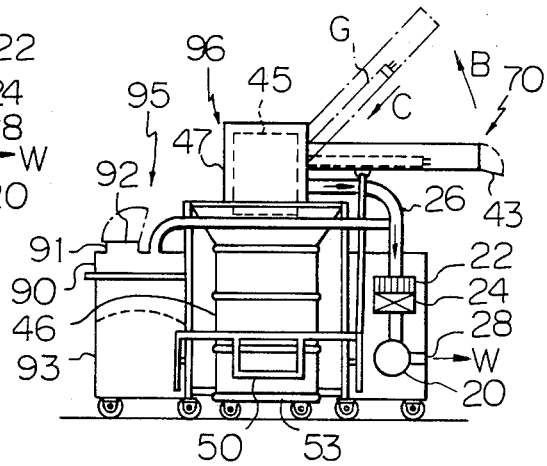
FIG. 12 is a side elevational view, partly in cross section, of a seventh embodiment of the invention.

FIG. 12 illustrates an assembled apparatus in which the apparatus 95 for storing used batteries is combined with the apparatus 96 for storing used glassware. The construction of the apparatus 96 for used glassware is the same as shown in FIG. 7. In this embodiment, two housings 47 and 90 are provided to accommodate batteries and glassware. However, a single fan 20 can draw heat and injurious substances from inner spaces of the two housings, simultaneously. Accordingly, one filter 22 and one adsorbent unit 24 are sufficient for the assembled apparatus. It can be appreciated that from an economical point of view this apparatus provides an excellent transportation system and reutilization system for used products, because used glassware and used batteries can be stored in a single apparatus at the same time.

While there have been shown and described preferred embodiments, it is to be understood that various other adaptations and modifications may be made within the skill of the art for use with particular applications, without departing from the spirit and scope of the invention.

I claim:

1. An apparatus for destroying and storing used products containing injurious substances, comprising:
a housing for accommodating used products;
an inlet portion for receiving the used products;
means in said housing for crushing the used products in said housing;
suction means, including a passage for ventilation air, for drawing injurious substances suspended in air in said housing;
a filter for removing dust from the air;
adsorbent means for adsorbing said substances;
said filter and said adsorbent means being located in said passage for ventilating air; and
an outlet portion for exhausting said ventilating air after it has passed through said suction means,
said inlet portion including means for breaking the used products and directing the used product broken therein therealong toward said crushing means for crushing the broken used product, said breaking and directing means including two hollow guide arms having means for receiving therein a used product such that the used product is partially received in each of said two arms, at least one of said two arms being reciprocally vertically pivotable between a first position in which the used product is partially receivable in each of said two arms and a second position in which the used product is folded and broken by the pivotal movement of said at least one of said two arms.

2. An apparatus as in claim 1, wherein said at least one of said two arms is pivotable upward so as to direct the portion of the broken product therein downward toward said crushing means.

3. An apparatus as in claim 2, wherein said two arms are simultaneously vertically pivotable between a horizontal position in which said two arms are aligned for receiving therein the used product and an upwardly inclined position in which the portion of the broken used product in each of said two arms is directed downward toward said crushing means.

4. The apparatus of claim 3, wherein the ejector door is controlled such that the ejector door never opens unless said entrance door is closed.

5. The apparatus of claim 3, wherein said two guide arms are removably attached to said housing.

6. An apparatus as in claim 3, wherein said two guide arms are pivotably mounted on said housing and have bottom sides, said apparatus further comprising sealing members mounted on said housing so as to be maintained in contact with said bottom sides so as to isolate the interior of said housing from the outside atmosphere during the reciprocal pivotable movement of said two guide arms.

7. An apparatus as in claim 3, wherein said two guide arms are adapted to receive used elongated fluorescent light bulbs.

8. An apparatus as in claim 7, further comprising an ejector door fixed to said arms between said arms so as to be closed blocking communication between the interiors of said two arms and said housing when said two arms are in said horizontal position, and open providing communication therethrough between the interiors of each of said two arms and said housing when said two arms are in said inclined position, and an entrance door on an end of one of said two arms, remote from said ejector door.

9. An apparatus as in claim 8, wherein said two arms are removably attached to said housing.

10. An apparatus as in claim 8, wherein said two arms are telescopic.

11. An apparatus as in claim 3, wherein said two arms are telescopic.

12. The apparatus of claim 1, wherein said inlet portion includes an entrance door for receiving the used product and an ejector door located opposite to said entrance door, said ejector door being closed when said at least one of said two arms is in said first position and being opened when said at least one of said one two arms is in a said second position.

13. An apparatus as in claim 12, wherein said two arms are removably attached to said housing.

14. An apparatus as in claim 12, wherein said two arms are telescopic.

15. The apparatus of claim 12, wherein said ejector door is controlled such that the ejector door never opens unless said entrance door is closed.

* * * * *